United States Patent [19]
Nakamura

[11] Patent Number: 6,132,650
[45] Date of Patent: *Oct. 17, 2000

[54] METHOD AND APPARATUS FOR MANUFACTURING DISTRIBUTED REFRACTIVE INDEX PLASTIC OPTICAL-FIBER

[75] Inventor: Tetsuya Nakamura, Yokkaichi, Japan

[73] Assignee: Sumitomo Wiring Systems, Ltd., Yokkaichi, Japan

[*] Notice: This patent is subject to a terminal disclaimer.

[21] Appl. No.: 09/035,812

[22] Filed: Mar. 6, 1998

[30] Foreign Application Priority Data

Mar. 7, 1997 [JP] Japan ................................. 9-052979

[51] Int. Cl.$^7$ ........................................................ B29D 11/00
[52] U.S. Cl. ........................... 264/1.29; 264/1.27; 425/71; 425/72.2; 425/174.2
[58] Field of Search ................................. 264/1.24, 1.28, 264/1.29, 1.27, 1.1; 425/71, 377, 378.2, 72.2, 174.2

[56] References Cited

U.S. PATENT DOCUMENTS

| | | |
|---|---|---|
| 3,999,834 | 12/1976 | Ohtomo et al. . |
| 5,541,247 | 7/1996 | Koike . |
| 5,593,621 | 1/1997 | Koike et al. ............................ 264/1.29 |
| 5,614,253 | 3/1997 | Nonaka et al. . |
| 5,639,512 | 6/1997 | Nonaka et al. . |
| 6,013,205 | 1/2000 | Nakamura ............................ 264/1.27 |

FOREIGN PATENT DOCUMENTS

| | | |
|---|---|---|
| 63-218903 | 9/1988 | Japan . |
| 5-60931 | 3/1993 | Japan . |
| 6-186442 | 7/1994 | Japan . |
| 7-13029 | 1/1995 | Japan . |
| 7-27928 | 1/1995 | Japan . |
| 7-5329 | 1/1995 | Japan . |
| 9-218311 | 8/1997 | Japan . |
| 9-218312 | 8/1997 | Japan . |

*Primary Examiner*—Mathieu D. Vargot
*Attorney, Agent, or Firm*—Greenblum & Bernstein, P.L.C.

[57] ABSTRACT

A base polymer is mixed with a non-polymerizable compound having a higher refractive index to form a fiber material. This material is continuously transformed into a fiber in a fiber-preparing unit. The fiber is dipped in diffusion tanks containing monomer substances so as to diffuse these substances into the fiber, and cured in a heater so as to polymerize these substances. By alternatingly repeating this procedure, the monomer substances and the non-polymerizable compound are diffused in the fiber and form a graded refractive index. Next, the fiber is drawn, coated with a cladding and coiled. This method can be performed with a high running ratio, minimizing the necessity of scaling-up of the facilities when the production is increased, and easily confers a desired index grading on the fiber. Likewise, the method allow continued manufacturing of a graded refractive index plastic optical-fiber with a desired length and of constant quality.

14 Claims, 4 Drawing Sheets

METHOD AND APPARATUS FOR MANUFACTURING DISTRIBUTED REFRACTIVE INDEX PLASTIC OPTICAL-FIBER

BACKGROUND OF THE INVENTION

1. Field of the Invention

The present invention relates to a method for manufacturing a graded index type plastic optical-fiber and a manufacturing apparatus therefor.

2. Related Applications

This application is related to Japanese Patent Application No. HEI 9-52978, filed Mar. 7, 1997 and its counterpart U.S. patent application Ser. No. 09/035,851, filed Mar. 6, 1998, now U.S. Pat. No. 6,013,205.

3. Description of Background Information

In order to manufacture this type of plastic optical-fiber, several methods have been disclosed, for example, in Japanese patent applications published under the numbers HEI 5-507610 and HEI 7-27928.

In the method described in application HEI 5-507610, a cladding is formed of a cylindrical tube having a hollow central part which is filled with a liquid mixture consisting of a monomer and a compound having a high refractive index. The liquid mixture is then heated or irradiated with energy-carrying rays, thereby generating and propagating a polymerization reaction, preferentially on a predetermined site. The substance having a high refractive index thus forms a density gradient and is used as base material. The base material is melted by heating and elongated so as to vary its refractive index continuously along the radial direction. This base material constitutes the core part of the plastic optical-fiber.

In the method disclosed in application number HEI 7-27928, a polymerized fiber material is melted by heating and then spun to form a fiber. The fiber thus obtained is soaked in a solution containing a non-polymerizable compound having a refractive index lower than that of the initial polymer, whereby this non-polymerizable compound is impregnated and diffused into the fiber. In this manner, a plastic optical-fiber having a graded index is formed.

However, in the method disclosed in application HEI 5-507610, the fiber is formed by heating, fusing and drawing the base material. The fiber length producible from one base material is thus limited, i.e., the fiber length depends on the size of the base material.

In order to manufacture a longer fiber, the base material has to have a thicker diameter or a longer size. When the base material is thickened, the subsequent drawing process becomes difficult because of insufficient heating and fusing. When the base material is lengthened, the material should have a uniform graded index and constant transmission loss in the longitudinal direction. However, the manufacture of such a material requires stringent conditions to be satisfied for controlling the reactions and polymerization. When manufacturing a plastic optical-fiber having a length over 1,000 m and a diameter of 1 mm, a one-meter base material would have to have a diameter over 30 m.

Further, this method is a batch system in which a base material is first prepared, drawn, and then transformed into an optical fiber. The running ratio of the process therefore is not good and, as the production increases, the manufacturing facilities must be scaled up greatly.

In the method disclosed in application HEI 7-27928, the fiber is manufactured continuously, so that it can be made with a desired length. However, after the fiber is manufactured, it has to enable a non-polymerizable compound to diffuse from its surface inwards. A large molecular-size, low refractive-index compound is, however, difficult to diffuse into such a fiber, so that the refractive index is poorly graded.

In order to diffuse a large molecular-size, low refractive-index compound into the fiber, the compound and the fiber must be heated to a high temperature. However, strong heating tends to melt and cut the fiber and the fiber manufacturing becomes inconsistent.

In view of the above, an object of the invention is to provide a novel method of manufacturing a graded-index type, plastic optical-fiber and a manufacturing apparatus therefor. This method attains a good running ratio of the process and minimizes the scaling-up of installation required for production increase. Further, the plastic optical-fiber is easily provided with a desired graded index. Moreover, the graded-index fiber can be manufactured, continuously and constantly, in a desired length with a constant quality.

SUMMARY OF THE INVENTION

To this end, there is provided a method of manufacturing a graded refractive-index type plastic optical-fiber, including:

a) preparing a base polymer, a fiber material containing a non-polymerizable compound having a refractive index higher than that of the polymer, and a monomer-containing solution;

b) heating and melting the base polymer and the fiber material to obtain a melt;

c) continuously spinning the melt to form a fiber;

d) dipping the fiber in the monomer-containing solution and impregnating the fiber therewith, so that each of the monomer and the non-polymerizable compound are diffused in the fiber; and e) curing and hardening the monomer.

The method may further include:

f) alternatingly repeating the steps d) and e).

Advantageously, the method may further alternatively include:

f) drawing the fiber to give it an orientation; and g) forming a cladding on the outer surface of the fiber.

There is also provided an apparatus for manufacturing a graded refractive-index type plastic optical-fiber, comprising:

a) a fiber-preparing mechanism comprising a unit for mixing a base polymer and a fiber material containing a non-polymerizable compound having a refractive index higher than that of the base polymer to obtain a mixture, a unit for heating and melting the mixture to obtain a melt, and a unit for spinning the melt to continuously form a fiber;

b) a plurality of monomer-diffusing devices each comprising a unit for containing a monomer solution, a unit for dipping the fiber in said monomer solution to obtain diffused monomer in the fiber, and a unit for recovering the fiber from the unit for dipping the fiber;

c) a curing unit which can be a device for heating the diffused monomer or a device for irradiating the diffused monomer with an electromagnetic wave such as ultra-violet rays; and d) a first handling mechanism for gassing the fiber exiting from the fiber-preparing mechanism, alternatingly through the diffusing devices and the curing unit.

According to another embodiment of the present invention, the device may include:

a) a fiber-preparing mechanism comprising a unit for mixing a base polymer and a fiber material containing a non-polymerizable compound having a refractive index higher than that of the base polymer to obtain a mixture, a unit for heating and melting the mixture to obtain a melt, and a unit for spinning the melt to continuously form a fiber;

b) a monomer-diffusing device comprising a unit for containing a monomer solution, at least one unit for dipping the fiber in the monomer-containing solution to obtain diffused monomer in the fiber, and at least one unit for recovering the fiber from said unit for dipping the fiber;

c) a curing unit which can be a device for heating the diffused monomer or a device for irradiating the diffused monomer with an electromagnetic wave such as ultra-violet rays; and d) one of a plurality of second handling mechanisms for passing the fiber exiting from the monomer-diffusing device through the curing unit and returning the fiber into the monomer-diffusing device.

The apparatus may further include:

e) a hot-drawing mechanism for drawing the fiber exiting from the curing mechanism; and f) cladding mechanism for forming a cladding on the outer surface of the fiber.

The base polymer of the invention comprises a non-crystalline high-molecular size substance, such as poly (methyl methacrylate), polystyrene, polycarbonate, or the like. Preferably, this base polymer gets only a small transmission loss due to dispersion and absorption in the wavelength range of the light source used. To obtain such a polymer, a monomer belonging to a group such as (meth) acrylates, styrene-based compounds, fluoroacrylates, fluoromethacrylates, or the like, may be used.

Examples of each monomer group are described hereinafter.

a) methacrylates and acrylates:
methyl methacrylate, ethyl methacrylate, isopropyl methacrylate, t-butyl methacrylate, benzyl methacrylate, phenyl methacrylate, cyclohexyl methacrylate, diphenylmethyl methacrylate, ethyl acrylate, methyl acrylate, n-butyl acrylate, etc.;

b) styrene-based compounds:
styrene, α-methylstyrene, chlorostyrene, bromostyrene, dichlorostyrene, dibromostyrene, etc.;

c) fluoroacrylates:
2,2,2-trifluoroethyl acrylate, etc.;

d) fluoromethacrylates:
1,1,2-trifluoroethyl methacrylate, etc.

In order to prepare the fiber material of the invention, any one of the above-mentioned monomers may be used to form a polymer, which is subsequently used for that purpose. A plurality of monomers may also be used to form a copolymer for the same purpose.

The fiber material also contains a non-polymerizable compound. This compound preferably has a refractive index higher than that of the above polymer by at least 0.02, a good compatibility with the polymer and its monomer, and a high boiling temperature exceeding 200° C.

Examples of the non-polymerizable compound include hexyl acetate, benzyl benzoate, bis(2-methylhexyl) phthalate, a sebacic acid ester such as dibutyl sebaceate, adipate such as dihexyl adipate, dimethyl phthalate, diphenyl sulfide, and the like. Preferably, one or more compounds are used in combination, according to the refractive index of the base polymer.

The solution used in the diffusion tank is preferably a polymerizable monomer, more preferably the monomer constituting the polymer used for the fiber.

BRIEF DESCRIPTION OF THE FIGURES

The above and other features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
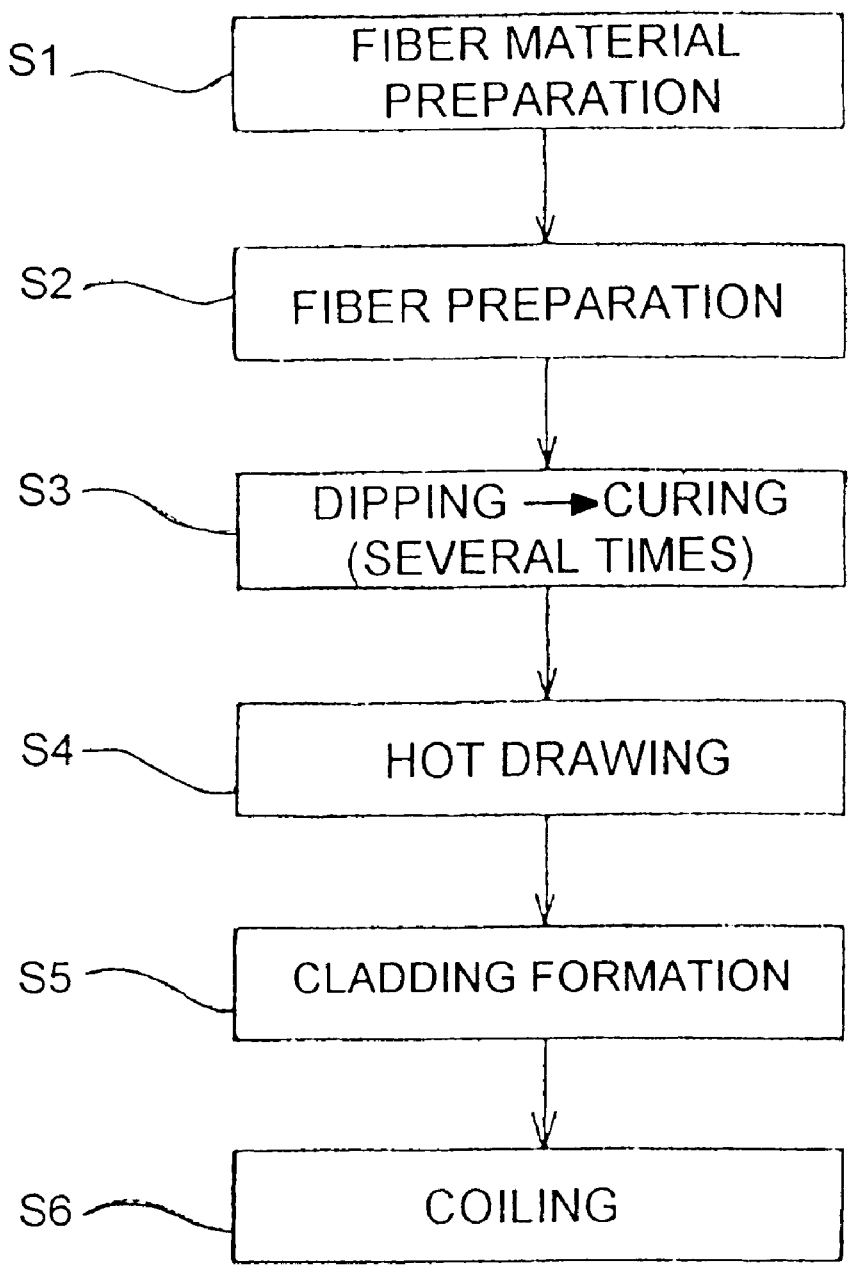
FIG. 1 is a flow chart illustrating the manufacturing process of a graded-index, plastic optical-fiber according to a first embodiment of the invention.
Figure 2:
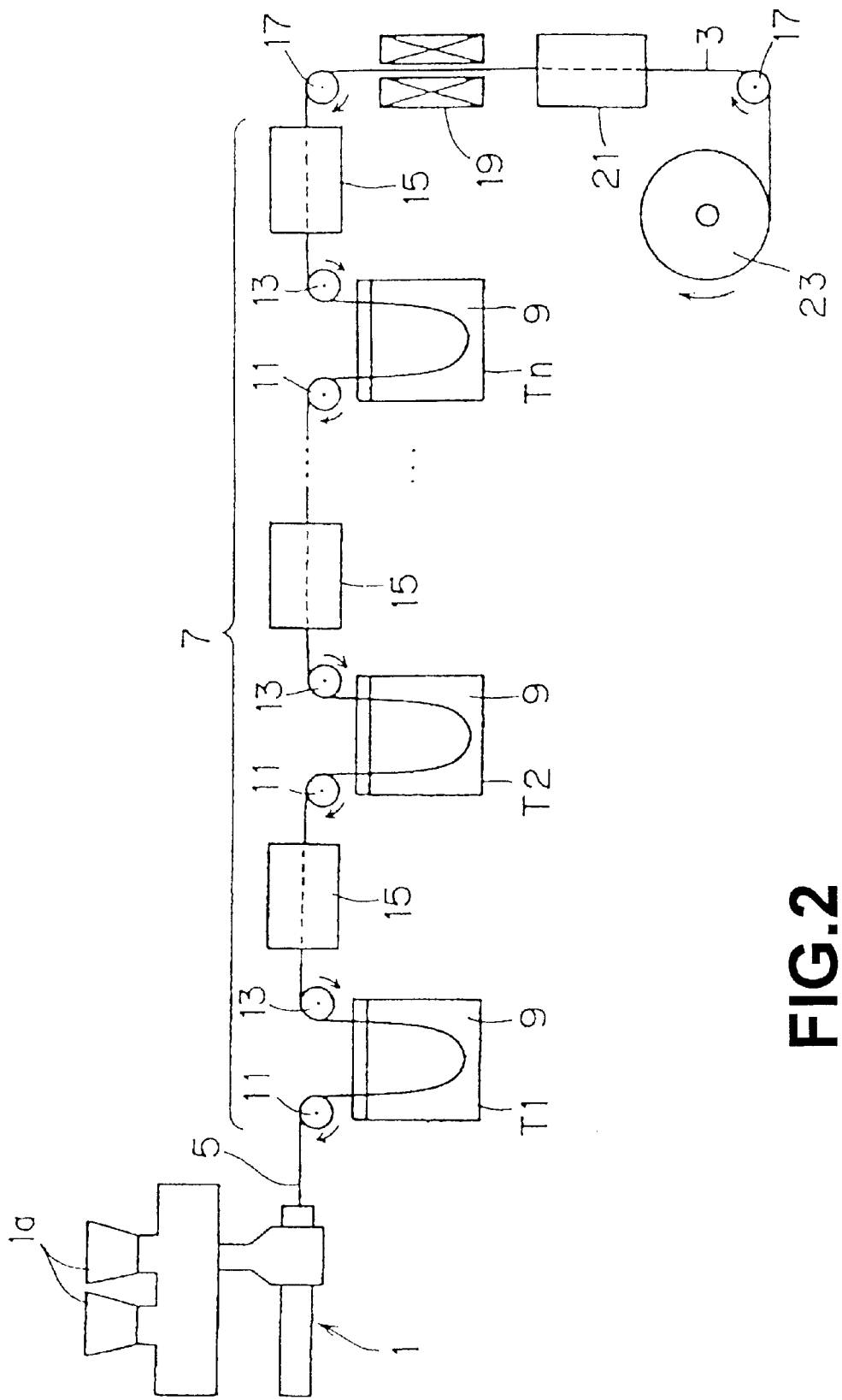
FIG. 2 shows the construction of a manufacturing device used for the process shown in FIG. 1.

FIG. 1 is a flow chart showing the manufacturing process of the graded-index, plastic optical-fiber according to the first embodiment, and FIG. 2 shows the structure of the manufacturing device used for this process.

In the manufacturing step 1 (S1), a fiber material is prepared. In order to prepare this material, a monomer, or a mixture of a plurality of monomers, is/are mixed with a non-polymerizable compound having a higher refractive index than the polymer which is to be produced from the aforementioned monomers. The mixture is heated while stirring to give a solidified polymer. The latter is crushed and pelletized. Polymerization is controlled so as to obtain an average molecular weight of 100,000 to 200,000, preferably 130,000 to 150,000.

As shown in FIG. 2, the pelletized fiber material is fed into a fiber-preparing unit 1 via a hopper 1a. In the unit 1, the supplied fiber material is stirred, melted by a heater, mixed by a screw and spun out from the die point to form a fiber. In this manner, the fiber 5, which forms subsequently the core part of the plastic optical-fiber, is continuously manufactured (step S2).

The fiber 5 thus manufactured in fiber-preparing unit 1 is subsequently fed into refractive-index grading unit 7 to form an appropriate distribution of the index. This unit 7 includes a plurality of diffusion tanks T1 to Tn (n is an integer of at least 2) filled with monomer 9; a corresponding number of feed rollers 11 and exit rollers 13 being set up at each tank T1 to Tn and serving as a transport mechanism; and the corresponding number of heaters 15 also set up at T1 to Tn.

When the fiber 5 is dipped into the diffusion tanks T1 to Tn, the monomer 9 is diffused inside the fiber 5 or attached on the surface thereof. The monomer 9 is polymerized and hardened by heater 15. This heater 15 is installed at the transport passage of fiber 5, located downstream from each of tanks T1 to Tn. The fiber 5 is heated by heater 15 so as to have a temperature at which the fiber will not be melted, i.e., a temperature less than the glass-transition temperature +40° C.

The running rate of feed rollers 11 and exit rollers 13 for each of T1 to Tn is kept constant. Each feed roller 11 continuously supplies one of the diffusion tanks T1 to Tn containing the monomer 9 with the fiber 5 leaving the transport passage. The fiber 5 is then taken up from the monomer 9 by an exit roller 13 and sent to a heater 15 located downstream, and onward to diffusion tanks T1 to Tn.

In this type of refractive index grading unit 7, the fiber 5 leaving the fiber-preparing unit 1 is conveyed by a feed roller 11 and an exit roller 13 of each of diffusion tanks T1 to Tn and successively passed through each of the diffusion tanks and heaters 15. Thus, the dipping process in T1 to Tn and curing process in a heater 15 are alternatingly repeated for several times (step S3).

Grading of the refractive index of fiber 5 is carried out by dipping fiber 5 in diffusion tanks T1 to Tn. This process simultaneously diffuses the monomer 9 inside the fiber 5 and elutes a high refractive index, non-polymerizable compound which is preliminarily contained in the polymer constituting fiber 5. As a drawback of such a system, the fiber 5 containing monomer 9 is soft and easily dissolved in the monomer 9. Accordingly, the polymer itself, constituting the fiber 5, is eluted out together with the non-polymerizable compound. If the fiber polymer is dipped in the monomer 9 for a long time, it can be eluted out excessively and the fiber 5 will be dissolved completely.

To manufacture a plastic optical-fiber 3 having a constant quality, elution of the fiber polymer must be restrained as well as the diffusion of the monomer 9 and the non-polymerizable compound in the fiber 5. However, as the monomer 9 has a low viscosity, the fiber polymer is easily dissolved in the monomer 9. The fiber 5 then becomes soft and is able to be dissolved into the monomer 9. In such a situation, when a convection of the monomer 9 is formed in diffusion tanks T1 to Tn or the fiber 5 is subjected to a skewed tension, the fiber polymer is eluted locally. As a result, the fiber 5 after dipping will have an inconsistent diameter or index grading.

Therefore, in the present embodiment, a curing step is installed between each dipping step. The monomer 9 is first diffused in fiber 5 by dipping, and then cured in the curing step so as to raise the hardness of the fiber 5. The fiber 5 is subsequently sent to the dipping step. This process avoids an excessive softening of the fiber 5 during dipping. As a result, an index grading can be performed, while restraining the elution of the fiber polymer.

The fiber 5 after the passage to each heater 15 preferably has a hardness (Hs) equal to, or greater than 30, measured by a Spring-type hardness meter. When dipping is prolonged, there will be more elution of the polymer contained in the fiber 5. Therefore, one dipping time is preferably limited to 20 minutes or less.

As the fiber 5 passes through a plurality of monomer dipping steps and curing steps, it gains a bi-dimensional distribution of the index grading, which decreases proportionally to the square of the distance from the center of fiber 5. Subsequent to the last heater 15, where the monomer 9 diffused in the fiber 5 or attached on the surface thereof are completely polymerized, the fiber 5 is sent to a drawing unit 19 via a turn roller 17.

In the drawing unit 19, fiber 5 is drawn under heating. The fiber 5 after dipping does not have an oriented structure. This drawing procedure confers upon the fiber 5 an appropriate orientation and a mechanical strength (step S4).

The heat-drawn fiber 5 is then sent to a cladding-forming unit 21 to form a cladding (step S5). To form this cladding, a resin is extruded onto the outer surface of the continuously delivered fiber 5. To this purpose, a transparent resin is used which has a refractive index lower than that of the core, i.e., fiber material of the fiber 5.

As is mentioned above, the fiber 5 proceeds successively through an index-grading unit 7, a drawing unit 19 and a cladding-forming unit 21 and forms a plastic optical-fiber 3. This optical fiber 3 is then sent to a turn roller 17 and reeled continuously on a coiler 23 (step S6).

Once reeled on coiler 23, the plastic optical-fiber 3 is uncoiled and coated with polyethylene, poly (vinyl chloride), etc., thereby obtaining an optical fiber cable or cord.

According to the present embodiment, the plastic optical-fiber is manufactured continuously and not by a batch system. The process is therefore performed with a high running ratio which minimizes the necessity of scaling-up of the facilities, even through the production is to be increased, and which allows obtaining an index-grading type, plastic optical-fiber with a desired length.

As a high refractive index, non-polymerizable compound is preliminarily blended with the base polymer of fiber 5, the glass-transition temperature of the polymer is lowered and its solubility into monomer 9 is increased. As such, when the polymer is dipped in monomer 9, the fiber 5 is easily impregnated with the monomer 9 without excessive heating and the non-polymerizable compound is diffused easily and rapidly in the fiber 5. Therefore, grading of the refractive index is easily accomplished. Moreover, the process enables avoiding the melting off of the fiber 5, which is caused when it is heated at a high temperature as described in published Japanese application HEI 7-27928, and produces the plastic optical-fiber 3 in a constant manner.

Further, the monomer 9 is used in diffusion tanks T1 to Tn has a small molecular size. Therefore, it can be diffused easily in the fiber 5, so that the refractive index can be easily graded.

The grading of the refractive index is also effected by alternatingly repeating the dipping step and the curing step. Accordingly, a predetermined index grading can be obtained by restraining the elution by soaking of the polymer that constitutes the fiber 5. When dipped, the fiber 5 can be excessively softened and the constituent polymer of the fiber 5 can be eluted out. There then occurs a drift in the fiber's outer diameter or a disarray in the index grading. The present method overcomes these drawbacks and permits production of plastic optical-fiber 3 of a constant quality.

Further, the fiber material for fiber 5 is pelletized, melted by heating, blended and spun. Therefore, even if the fiber material contains heterogeneous portions before pelletizing, these can be completely homogenized by blending in fiber-preparing unit 1 and transformed into a homogeneous plastic optical-fiber 3.

Also, the plastic optical-fiber 3 is coated with a cladding. This restrains the increase of optical loss caused by the flexion of fiber 3.

In the present embodiment, monomer 9 is diffused in the fiber 5 by dipping and polymerized by curing. Instead, polymerization can be effected by irradiating an electromagnetic wave such as ultra-violet rays.

Further, the cladding-forming step (S5) is effected after the hot drawing step (S4). However, it can also be done before the hot drawing step.

Figure 3:
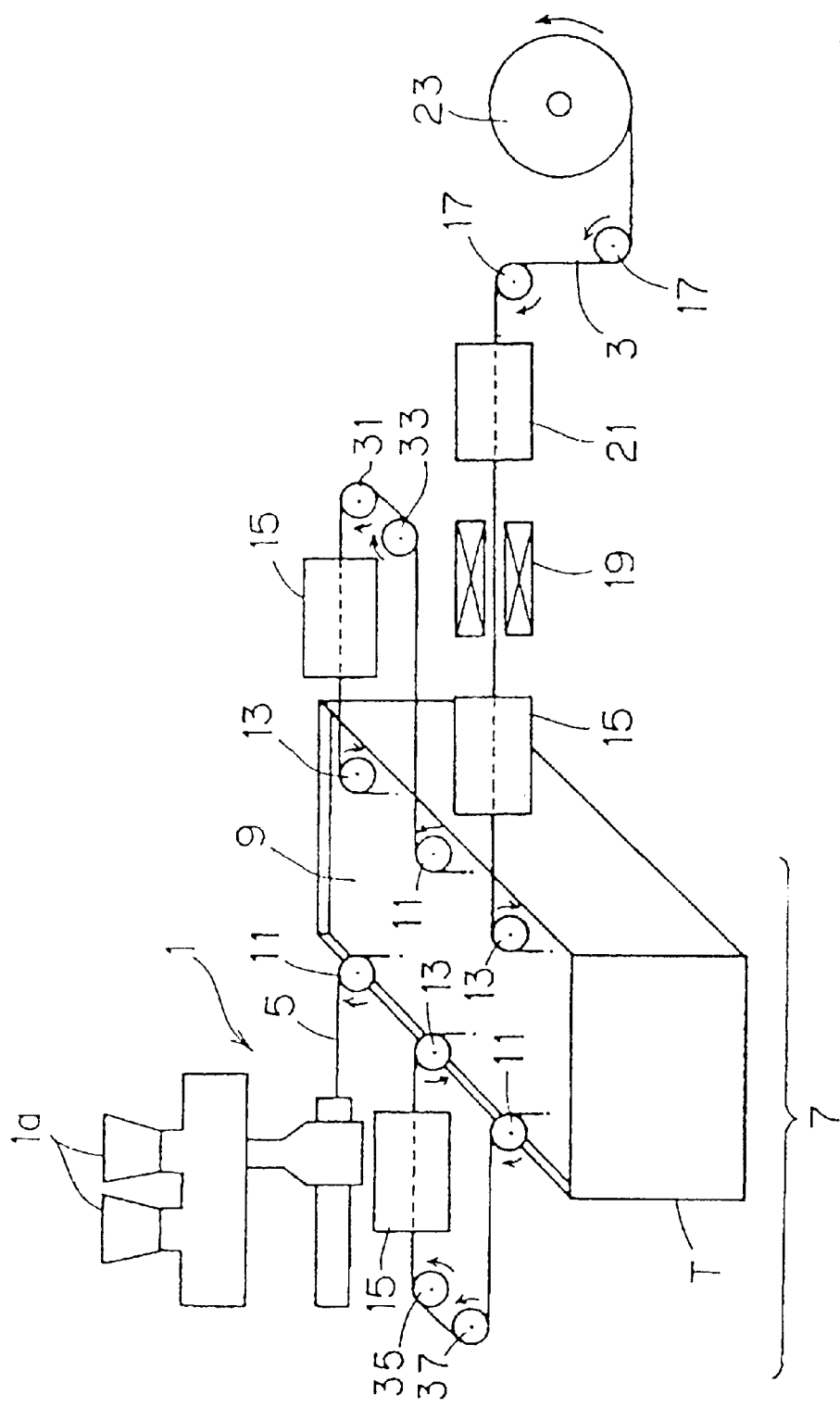
FIG. 3 shows a variant device of the manufacturing device of FIG. 2.

FIG. 3 shows a variant example of the aforementioned device for manufacturing a graded-index type, plastic optical-fiber. This device differs from that shown in FIG. 2, in that the fiber 5 is dipped in a single diffusion tank T for several times, e.g., thrice in the example in FIG. 3. In this figure, corresponding reference numerals are used in FIG. 2 and the fiber is handled in generally the same manner.

In this device, fiber 5 leaving fiber-preparing unit 1 is passed through monomer 9 by the first pair of a feed roller 11 and an exit roller 13. It is then passed through the first heater 15 and turned by 180° at turn rollers 31, 33. The fiber is passed through the monomer 9 by the second pair of a feed roller 11 and exit roller 13, through the second heater 15, and turned by 180° at turn rollers 35, 37. The fiber 5 is further passed through the monomer 9 by the third pair of rollers 11, 13 and heater 15, and then sent to a drawing unit 19.

First and second examples of the embodiments according to the present invention are described hereinafter.

EXAMPLE 1

In the fiber material preparing step, 83 parts by weight of methyl methacrylate (MMA) and 17 parts by weight of benzyl benzoate (BEN) were mixed. To this, 0.5 part by weight of butyl peroxide (PBD) as a polymerization-initiating agent was added and mixed. After mixing, the mixture was put under a vacuum of 1 torr by sucking the air out. After having removed air sufficiently, the mixture was stirred slowly in a warm water bath at 40° C. for 48 hours under vacuum, during which polymerization was initiated. The mixture was further polymerized for 24 hours under vacuum at 60° C., whereby the polymer as a material for fiber 5 was formed.

The polymer thus obtained had a weight-average molecular weight of 120,000 to 150,000. The polymer was crushed into a particle size of 3 mm by a micro-hammer mill and pelletized.

In order to homogenize the quality difference of the pellets, these were carefully mixed, melted with heating, blended at a maintained temperature of 220° C. and spun into a fiber 5 having a diameter of 3.4 mm.

In the present example, the dipping step and the curing step were repeated alternatingly three times in order to grade the refractive index. The diffusion tank contained MMA as a monomer, 0.1% by weight of azoisobutyronitrile as an initiating agent and 0.1% by weight of n-butylmercaptan as a chain-transfer agent. The temperature of the monomer solution was kept at 20° C. and the dipping duration for each step was 8 minutes.

In the first and second curing step, fiber 5 was heated at 60° C. for 50 minutes. In the third curing step, the temperature of fiber 5 was gradually increased from 50° C. to 80° C. during 20 hours, so that the monomer in the fiber 5 or on the surface thereof was completely polymerized.

After the first dipping step, fiber 5 had a diameter of 3.02 mm. After the first curing step, fiber 5 had a hardness (Hs) of 34, measured by a spring-type hardness meter. After the second dipping and the curing step, the corresponding figures were 2.86 mm and HS=33, respectively. After the third dipping step, the diameter of fiber 5 was 2.68 mm.

Subsequently, fiber 5 was drawn down to a diameter of 0.9 mm in the hot drawing step. In the cladding-forming step, poly (1,1,2-trifluoroethylmethacrylate) was melted at about 120° C. to 130° C. and extruded around the fiber 5, to form a cladding.

Figure 4:
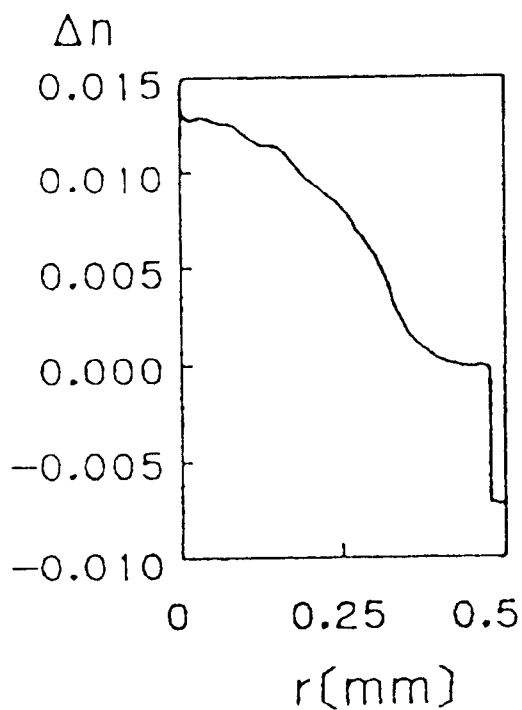
FIG. 4 is a graph showing the index grading of the plastic optical-fiber manufactured according to the first embodiment.

As the result, a plastic optical-fiber 3 having a graded index shown in FIG. 4 was obtained. This fiber 3 has a diameter of 1 mm. According to tensile tests, the tensile strength at breaking point is 90 Mpa and the elongation at break is 110%. The difference $\Delta n$ of the refractive index between the core center and core periphery is 0.013. The transmission loss is 187 dB/km. The graded index distribution is not disrupted in the longitudinal direction of the fiber. The distribution of the graded index was measured by a shearing interference microscope. The transmission loss was measured by a cut-back method from 50 m to 5 m.

EXAMPLE 2

In order to increase $\Delta n$, diphenylsulfide having a high refractive index (n=1.632) was used as a non-polymerizable compound for grading the refractive index. Further, the dipping step and the curing step were repeated 5 times. The other processes were the same as in example 1.

In the fiber-material preparing step, 83 parts by weight of MMA and 17 parts by weight of diphenylsulfide were mixed. To this, 0.5 part by weight of (PBD) butyl peroxide as a polymerization-initiating agent was added and mixed. After mixing, the mixture was put under a vacuum of 1 torr by sucking the air out. After having removed the air sufficiently, the mixture was stirred slowly in a warm water bath at 40° C. for 48 hours under a vacuum, during which polymerization was initiated. The mixture was further polymerized for 24 hours under a vacuum at 60° C., whereby the polymer as a material for fiber 5 was formed.

The polymer thus obtained had a weight-average molecular weight of 120,000 to 150,000. The polymer was crushed into a particle size of 3 mm by a micro-hammer mill and pelletized.

In order to homogenize the quality difference of the pellets, these were carefully mixed, melted by heat, blended at a maintained temperature of 220° C. and spun into a fiber 5 having a diameter of 3.4 mm.

In the present example, the dipping step and the curing step were repeated alternatingly five times in order to grade the refractive index. The diffusion tank contained MMA as a monomer, 0.1% by weight of azoisobutyronitrile as an initiator and 0.1% by weight of n-butylmercaptan as a chain-transfer agent. The temperature of the monomer solution was kept at 20° C. and the dipping duration for each step was 5 minutes.

In the first to fourth curing steps, fiber 5 was heated at 60° C. for 50 minutes. In the fifth curing step, the temperature of fiber 5 was gradually increased from 50° C. to 80° C. during 20 hours, so that the monomer in the fiber 5 or on the surface thereof were completely polymerized.

After the first dipping step, fiber 5 had a diameter of 3.22 mm. After the first curing step, fiber 5 had a hardness (Hs) of 43. After the second dipping step, the diameter of fiber 5 was 2.84 mm. The fiber 5 was not softened excessively by dipping and was conferred with an appropriate index grading.

Subsequently, fiber 5 was drawn down to a diameter of 0.9 mm in hot drawing step. In the cladding-formation step, poly (1,1,2-trifluoroethylmethacrylate) was melted at about 120° C. to 130° C. and extruded around the fiber 5, to form a cladding.

Figure 5:
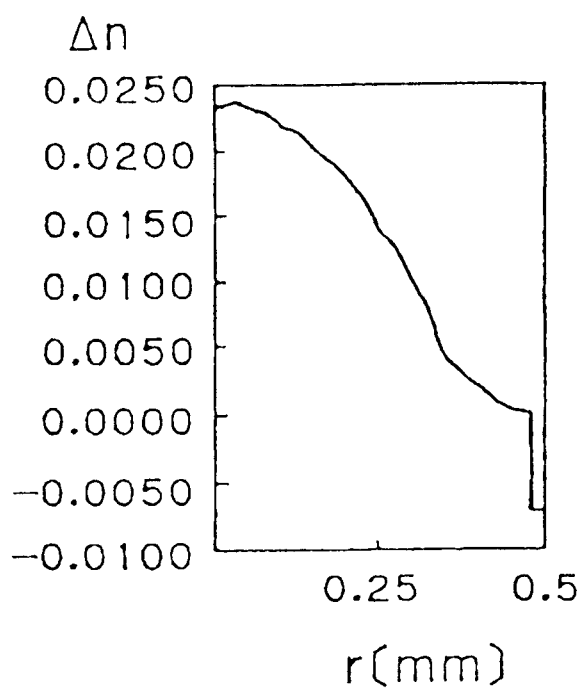
FIG. 5 is a graph showing the index grading of the plastic optical-fiber manufactured according to a second embodiment.

As the result, a plastic optical-fiber 3 having a graded index shown in FIG. 5 was obtained. This fiber 3 has a diameter of 1 mm. According to tensile tests, the tensile strength at break is 90 Mpa and the elongation at break is 110%. The difference $\Delta n$ of the refractive index between the core center and core periphery is 0.024. The transmission loss is 176 dB/km. The graded index distribution is not disrupted in the longitudinal direction of the fiber.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 9-52979 filed on Mar. 7, 1997, which is herein expressly incorporated by reference in its entirety.

What is claimed:

1. A method of manufacturing a graded refractive-index plastic optical-fiber, said method comprising:

preparing a base polymer and a monomer-containing solution;

preparing a fiber material from said base polymer and including a non-polymerizable compound having a refractive index higher than that of said polymer;

heating and melting said fiber material to obtain a melt;

continuously spinning said melt to form a fiber;

dipping said fiber in said monomer-containing solution and impregnating said fiber therewith, so that each of said monomer and said non-polymerizable compound are diffused in said fiber; and curing and hardening said monomer.

2. The method according to claim 1, further comprising alternatingly repeating the steps of dipping and curing of claim 1.

3. The method according to claim 1, wherein said method further comprises:

drawing said fiber to give an orientation to said fiber; and forming a cladding on the outer surface of said fiber.

4. The method according to claim 2, wherein said method further comprises:

drawing said fiber to given an orientation to said fiber; and forming a cladding on the outer surface of said fiber.

5. A device for manufacturing a graded refractive-index plastic optical-fiber, said device comprising:

a fiber-preparing mechanism comprising a unit for mixing a base polymer and a non-polymerizable compound having a refractive index higher than that of said base polymer to obtain a mixture, a unit for heating and melting said mixture to obtain a melt, and a unit for spinning said melt to continuously form a fiber, a plurality of monomer-diffusing devices, each device comprising a unit for containing a monomer solution, a unit for dipping said fiber in said monomer solution to obtain diffused monomer in said fiber, and a unit for recovering said fiber from said unit for dipping said fiber;

a curing unit; and a first handling mechanism for passing the fiber exiting from said fiber-preparing mechanism, alternatingly through said diffusing devices and said curing unit.

6. A device for manufacturing a graded refractive-index plastic optical-fiber according to claim 5, wherein said curing unit further comprises a device for heating said diffused monomer.

7. A device for manufacturing a graded refractive-index plastic optical-fiber according to claim 5, wherein said curing unit further comprises a device for irradiating said diffused monomer with an electromagnetic wave.

8. A device for manufacturing a graded refractive-index plastic optical-fiber according to claim 5, wherein said device further comprises:

a hot-drawing mechanism for drawing said fiber exiting from said curing unit; and a cladding mechanism for forming a cladding on the outer surface of said fiber.

9. A device for manufacturing a graded refractive-index plastic optical-fiber, said device comprising:

a fiber-preparing mechanism comprising a unit for mixing a base polymer and a non-polymerizable compound having a refractive index higher than that of said base polymer to obtain a mixture, a unit for heating and melting said mixture to obtain a melt, and a unit for spinning said melt to continuously form a fiber;

a plurality of monomer-diffusing devices each comprising a unit for containing a monomer solution, at least one unit for dipping said fiber in said monomer-containing solution to obtain diffused monomer in said fiber, and at least one unit for recovering said fiber from said unit for dipping said fiber;

a plurality of curing units; and at least one handling mechanism for passing the fiber exiting from one said monomer-diffusing device through a respective said curing unit and returning said fiber into a further said monomer diffusing device.

10. A device for manufacturing a graded refractive-index plastic optical-fiber according to claim 9, wherein each said curing unit further comprises a device for heating said diffused monomer.

11. A device for manufacturing a graded refractive-index plastic optical-fiber according to claim 9, wherein each said curing unit further comprises a device for irradiating said diffused monomer with an electromagnetic wave.

12. A device for manufacturing a graded refractive-index plastic optical-fiber according to claim 9, wherein said device further comprises:

a hot-drawing mechanism for drawing said fiber exiting from a final one of said curing units; and a cladding mechanism for forming a cladding on the outer surface of said fiber.

13. A device for manufacturing a graded refractive-index plastic optical-fiber according to claim 7, wherein said electromagnetic wave comprises ultra-violet rays.

14. A device for manufacturing a graded refractive-index plastic optical-fiber according to claim 11, wherein said electromagnetic wave comprises ultra-violet rays.

* * * * *

UNITED STATES PATENT AND TRADEMARK OFFICE
CERTIFICATE OF CORRECTION

PATENT NO. : 6,132,650
DATED : October 17, 2000
INVENTOR(S) : T. Nakamura

It is certified that error appears in the above-identified patent and that said Letters Patent is hereby corrected as shown below:

Title page,
Item [57], ABSTRACT,
Line 16, "allow" should be -- allows -- .

Column 9,
Line 39 (claim 4, line 3), "given" should be -- give -- .

Signed and Sealed this

Twentieth Day of November, 2001

*Attest:*

NICHOLAS P. GODICI
*Attesting Officer*  *Acting Director of the United States Patent and Trademark Office*